(12) United States Patent
Yazawa et al.

(10) Patent No.: US 12,253,094 B2
(45) Date of Patent: Mar. 18, 2025

(54) PUMP DEVICE

(71) Applicant: NIDEC INSTRUMENTS CORPORATION, Nagano (JP)

(72) Inventors: Takehiko Yazawa, Nagano (JP); Michiaki Takizawa, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 43 days.

(21) Appl. No.: 18/470,425

(22) Filed: Sep. 20, 2023

(65) Prior Publication Data

US 2024/0110568 A1 Apr. 4, 2024

(30) Foreign Application Priority Data

Sep. 30, 2022 (JP) .................................. 2022-158070

(51) Int. Cl.
| | |
|---|---|
| *F04D 29/24* | (2006.01) |
| *F04D 1/00* | (2006.01) |
| *F04D 29/22* | (2006.01) |
| *F04D 29/30* | (2006.01) |

(52) U.S. Cl.
CPC .............. *F04D 29/24* (2013.01); *F04D 1/00* (2013.01); *F04D 29/2222* (2013.01); *F04D 29/30* (2013.01); *F05D 2230/232* (2013.01)

(58) Field of Classification Search
CPC ........ F04D 29/24; F04D 1/00; F04D 29/2222; F04D 29/30; F05D 2230/232
See application file for complete search history.

(56) References Cited

U.S. PATENT DOCUMENTS

| | | | |
|---|---|---|---|
| 2021/0254482 A1* | 8/2021 | Park .......................... | F01D 5/02 |
| 2023/0120338 A1* | 4/2023 | Choi ..................... | F04D 29/284 |
| | | | 416/185 |

FOREIGN PATENT DOCUMENTS

JP 2020159206 10/2020

* cited by examiner

*Primary Examiner* — Bryan M Lettman
(74) *Attorney, Agent, or Firm* — JCIPRNET

(57) ABSTRACT

An impeller of a pump device includes a vane wheel fixed to a flange portion of a rotor member. The vane wheel includes a plurality of vane portions protruding from a disc portion opposed to the flange portion in an axial direction. At a tip end of each vane portion, a rib that is inserted into a fixing groove provided in the flange portion is provided. A gap in the axial direction is provided between a tip end of an inner peripheral portion including an end portion on an inner side in a radial direction of the rib and a bottom surface of the fixing groove, and a welded portion welded to the fixing groove is provided at a tip end on another side in the axial direction of an outer peripheral portion including an end portion on an outer side in the radial direction of the rib.

6 Claims, 10 Drawing Sheets

PUMP DEVICE

CROSS REFERENCE TO RELATED APPLICATION

This application claims the benefit of Japanese Application No. 2022-158070, filed on Sep. 30, 2022. The entirety of the above-mentioned patent application is hereby incorporated by reference herein and made a part of this specification.

BACKGROUND

Field of the Invention

At least an embodiment of the present invention relates to a pump device in which an impeller is rotated by a motor.

Description of the Related Documents

Japanese Unexamined Patent Publication No. 2020-159206 describes a pump device in which an impeller disposed in a pump chamber is rotated by a motor. The motor includes a rotor that rotates integrally with the impeller. The rotor includes a resin holding member that holds a bearing (radial bearing) through which a fixed shaft is passed. The holding member has a cylindrical shape with a collar, and the bearing is press-fitted inside the holding member.

In the pump device of Japanese Unexamined Patent Publication No. 2020-159206, the impeller rotating integrally with the rotor is configured by fixing a vane wheel to a collar portion (flange portion) at an upper end of the holding member. The vane wheel includes a disc portion that is opposed to the collar portion in an axial direction and vane portions that protrude from the disc portion toward the collar portion, and tip ends of the vane portions are fixed to the collar portion.

In a structure in which an impeller is formed by fixing a vane wheel to a flange portion provided in a holding member that holds a radial bearing, a fixing structure has been proposed in which grooves are formed in the flange portion, and tip ends of vane portions are inserted into the grooves and fixed by welding.

However, when the holding member of the rotor is molded from resin, the flange portion after molding is curved into an umbrella shape. When the tip end of the vane portion is inserted into the groove of the flange portion deformed into the umbrella shape to be fixed, the flange portion and the vane portion excessively interfere with each other at an inner peripheral portion of the impeller, and a gap is formed between the flange portion and the vane portion or a welding amount is insufficient at an outer peripheral portion of the impeller. Since the outer peripheral portion of the impeller receives a high fluid pressure, if the welding amount is insufficient, the strength becomes insufficient, and the welded portion may be peeled off during driving.

In view of the above, the present invention is to secure the welding strength between the flange portion and the vane wheel at the outer peripheral portion of the impeller in the pump device including the impeller in which the vane wheel is fixed to the resin flange portion.

SUMMARY

In order to solve the above problem, a pump device of at least an embodiment of the present invention includes a motor that includes a rotor and a stator; and an impeller that is disposed, when a direction along a rotation axis of the rotor is defined as an axial direction, in a pump chamber provided on one side in the axial direction with respect to the stator and rotates integrally with the rotor, in which the rotor includes a rotor member including a magnet holding portion in a tubular shape, and a drive magnet fixed to an outer peripheral surface of the magnet holding portion, the impeller includes a flange portion provided at an end portion on the one side in the axial direction of the rotor member, and a vane wheel fixed to the flange portion from the one side in the axial direction, the vane wheel includes a disc portion that is opposed to the flange portion in the axial direction, and a plurality of vane portions that protrude from the disc portion toward another side in the axial direction, the plurality of vane portions extend to an outer side in a radial direction at a plurality of positions in a circumferential direction around the rotation axis, at a tip end on the other side in the axial direction of each of the plurality of vane portions, a rib that is inserted into a fixing groove provided in the flange portion is provided, the rib includes an inner peripheral portion including an end portion on an inner side in the radial direction of the rib and an outer peripheral portion including an end portion on the outer side in the radial direction of the rib, a gap in the axial direction is provided between a tip end on the other side in the axial direction of the inner peripheral portion and a bottom surface of the fixing groove, and at a tip end on the other side in the axial direction of the outer peripheral portion, a welded portion welded to the fixing groove is provided.

According to at least an embodiment of the present invention, the vane wheel which is fixed to the flange portion provided at the end portion of the rotor member to form the impeller includes the vane portions which protrude from the disc portion, and at the tip ends of the vane portions, the ribs which are inserted into the fixing grooves provided in the flange portion are provided. In this way, by inserting the ribs into the fixing grooves, it is possible to suppress deformation of the vane portions due to water pressure. In addition, it is possible to suppress a decrease in efficiency due to the fluid passing between the tip ends of the vane portions and the flange portion. Further, the rib inserted into the fixing groove has a shape in which the outer peripheral portion is welded to the fixing groove and the inner peripheral portion forms a gap between the inner peripheral portion and the bottom surface of the fixing groove. With this configuration, even in a case where the flange portion is not formed into a designed shape and is curved into an umbrella shape, the inner peripheral portion of the rib is less likely to excessively interfere with the bottom surface of the fixing groove. Therefore, a large number of welding burrs are less likely to be generated at the excessively interfering portion and overflow from the fixing groove. Further, there is little risk that, as a result of excessive interference of the inner peripheral portion of the rib, the amount of insertion of the outer peripheral portion of the rib into the fixing groove is insufficient, resulting in non-welding or insufficient welding strength. Since the outer peripheral portion of the impeller receives a high fluid pressure, the vane portion may be peeled off from the flange portion if welding strength is insufficient. However, in the present embodiment, since the welding strength of the outer peripheral portions of the vane portions can be secured, the welded portions are less likely to be peeled off even when a high water pressure is received.

In at least an embodiment of the present invention, it is preferable that the welded portion is a crushed portion where a welding convex portion protruding from a tip end surface of the outer peripheral portion is crushed. In this way, by providing the welding convex portion at the outer peripheral portion, it is possible to avoid that the welding amount at the outer peripheral portion is insufficient. In addition, since the welding convex portion is not provided at the inner peripheral portion, it is possible to prevent the inner peripheral portion from becoming excessive interference.

In at least an embodiment of the present invention, it is preferable that each of the plurality of vane portions includes a vane portion main body that protrudes from the disc portion toward the other side in the axial direction, a plate thickness of the vane portion main body is larger than a width of the fixing groove, and a width of the rib protruding from a tip end surface of the vane portion main body is smaller than the width of the fixing groove. In this way, it is possible to increase the rigidity of the portion (vane portion main body) that receives water pressure. Further, a gap for accommodating welding burrs can be secured between the fixing groove and the rib.

In at least an embodiment of the present invention, it is preferable that the rib includes an intermediate portion that connects the inner peripheral portion and the outer peripheral portion, and the intermediate portion includes a reference surface that abuts on the bottom surface of the fixing groove. As described above, when the reference surface for positioning in the axial direction is provided in the intermediate portion in the radial direction, even in a case where the flange portion does not have a designed shape and is curved into an umbrella shape, the inner peripheral portion is unlikely to become excessive interference, and the welding amount of the outer peripheral portion is unlikely to be insufficient.

In at least an embodiment of the present invention, it is preferable that a tip end surface of the inner peripheral portion is a step surface recessed to the one side in the axial direction with respect to the reference surface. In this way, it is possible to prevent the inner peripheral portion from becoming excessive interference when the reference surface abuts on the bottom surface of the fixing groove.

In at least an embodiment of the present invention, it is preferable that the rib includes an intermediate portion that connects the inner peripheral portion and the outer peripheral portion, in at least a part of the plurality of vane portions, the intermediate portion includes a positioning convex portion that protrudes to the other side in the axial direction, and the positioning convex portion is fitted into a positioning concave portion provided in the bottom surface of the fixing groove. In this way, even in a case where a gap is provided between the fixing groove and the rib so that the welding burrs can be accommodated, the vane wheel can be positioned in the direction intersecting the axial direction by fitting the positioning convex portion and the positioning concave portion. For example, the vane wheel can be positioned in the circumferential direction.

According to at least an embodiment of the present invention, the vane wheel which is fixed to the flange portion provided at the end portion of the rotor member to form the impeller includes the vane portions which protrude from the disc portion, and at the tip ends of the vane portions, the ribs which are inserted into the fixing grooves provided in the flange portion are provided. In this way, by inserting the ribs into the fixing grooves, it is possible to suppress deformation of the vane portions due to water pressure. In addition, it is possible to suppress a degradation of efficiency due to the fluid passing between the tip ends of the vane portions and the flange portion. Further, the rib inserted into the fixing groove has a shape in which the outer peripheral portion is welded to the fixing groove and the inner peripheral portion forms a gap between the inner peripheral portion and the bottom surface of the fixing groove. With this configuration, even in a case where the flange portion is not formed into a designed shape and is curved into an umbrella shape, the inner peripheral portion of the rib is less likely to excessively interfere with the bottom surface of the fixing groove. Therefore, a large number of welding burrs are less likely to be generated at the excessively interfering portion and overflow from the fixing groove. Further, there is little risk that, as a result of excessive interference of the inner peripheral portion of the rib, the amount of insertion of the outer peripheral portion of the rib into the fixing groove is insufficient, resulting in non-welding or insufficient welding strength. Since the outer peripheral portion of the impeller receives a high fluid pressure, the vane portion may be peeled off from the flange portion if welding strength is insufficient. However, in the present embodiment, since the welding strength of the outer peripheral portions of the vane portions can be secured, the welded portions are less likely to be peeled off even when a high water pressure is received.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Hereinafter, a pump device 1 according to an embodiment of the present invention will be described with reference to the drawings. In the following description, an axial direction means a direction in which a rotation axis L of a motor 10 extends, a radial direction in an inner side in the radial direction and an outer side in the radial direction means a radial direction about the rotation axis L, and a circumferential direction means a rotation direction about the rotation axis L. A direction in which the rotation axis L extends is referred to as an axial direction, one side in the axial direction is referred to as L1, and the other side in the axial direction is referred to as L2.

Entire Configuration

Figure 1:
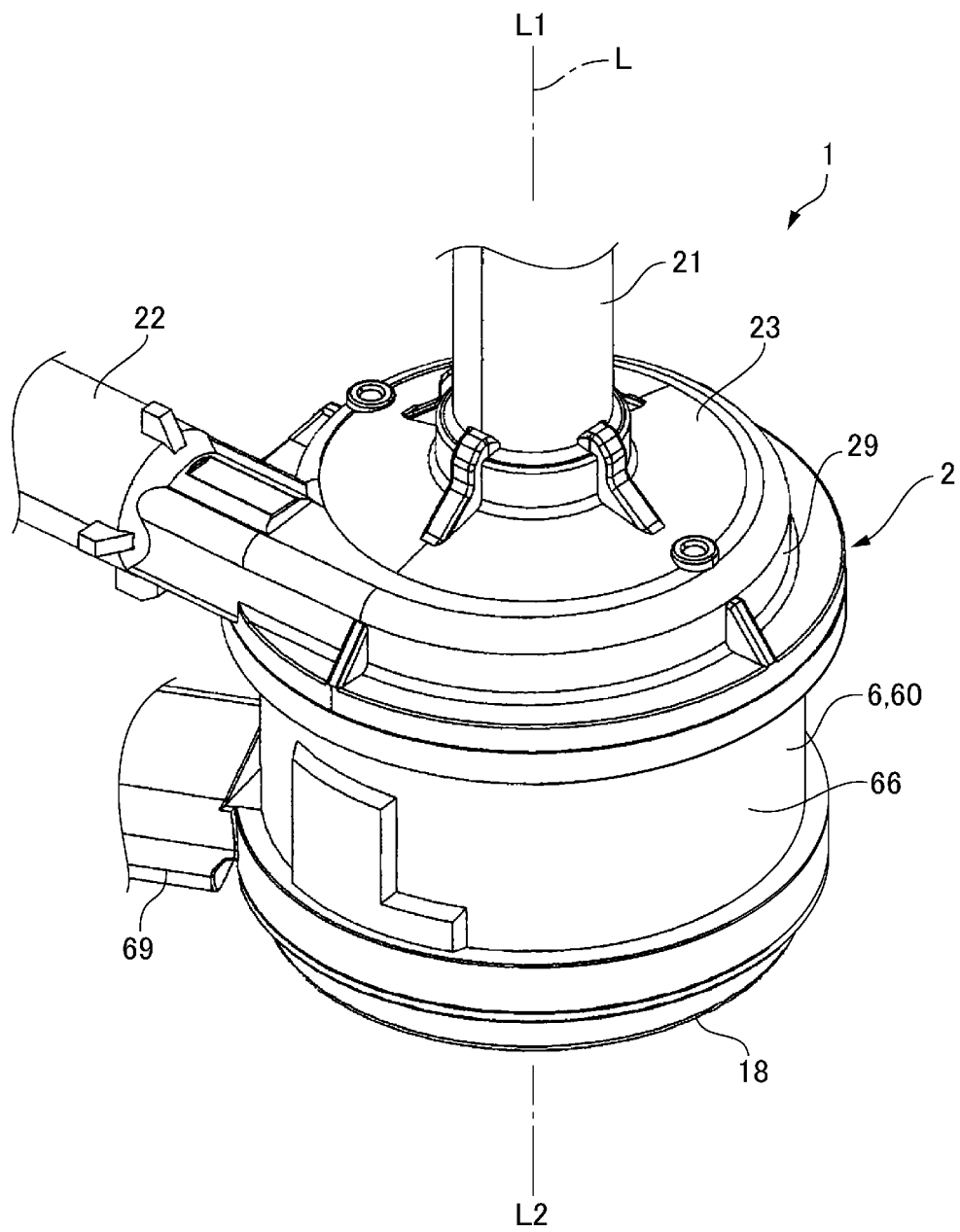
FIG. 1 is an external perspective view of a pump device to which the present invention is applied.
Figure 2:
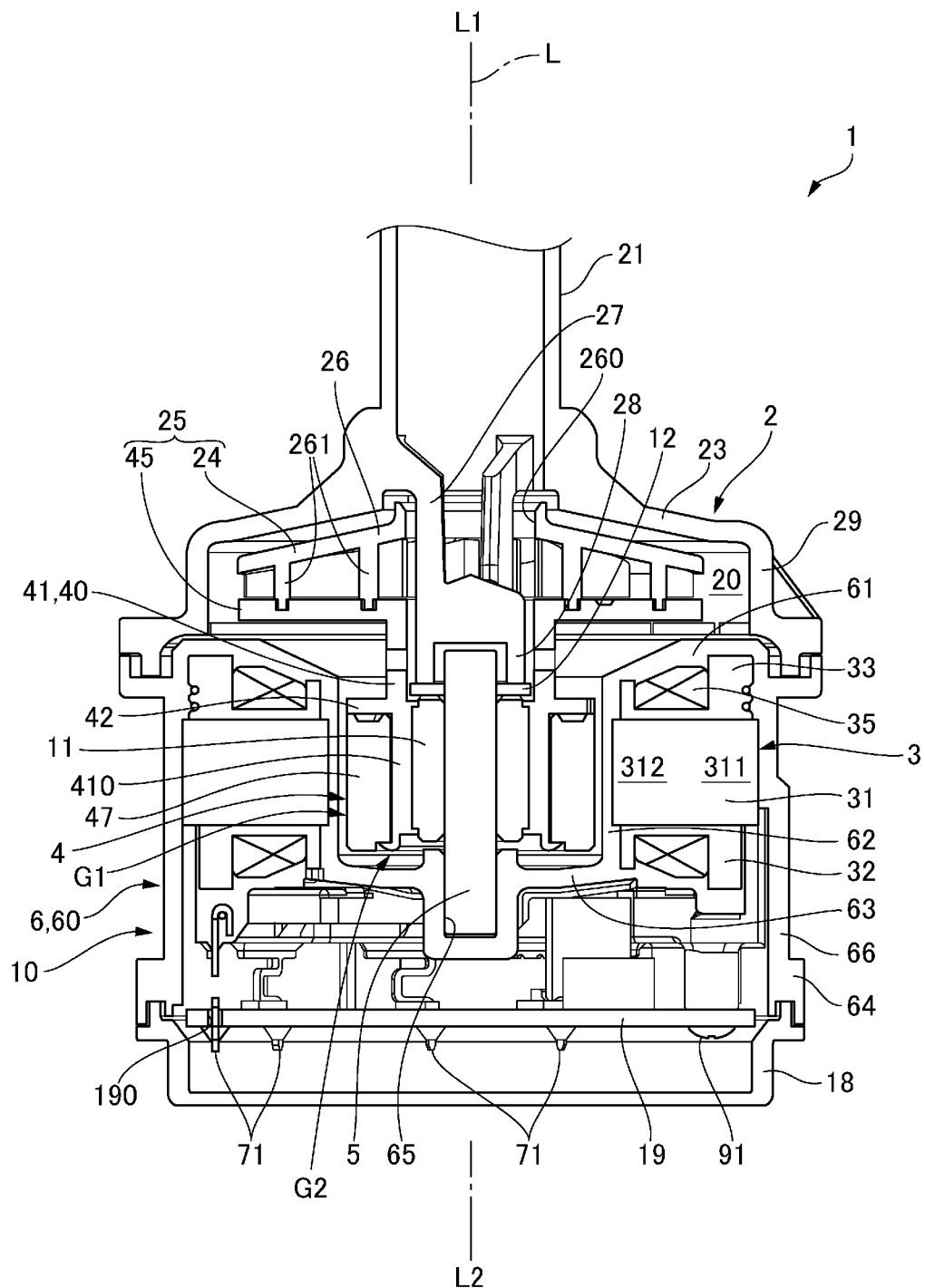
FIG. 2 is a cross-sectional view of the pump device illustrated in FIG. 1, taken along a plane including a rotation axis.

FIG. 1 is an external perspective view of a pump device 1 to which the present invention is applied. FIG. 2 is a cross-sectional view of the pump device 1 illustrated in FIG. 1 taken along a plane including the rotation axis L. As illustrated in FIGS. 1 and 2, the pump device 1 includes a case 2 provided with a suction pipe 21 extending to the one side L1 in the axial direction and a discharge pipe 22, a motor 10 disposed on the other side L2 in the axial direction with respect to the case 2, and an impeller 25 disposed in a pump chamber 20 inside the case 2. The impeller 25 is rotationally driven around the rotation axis L by the motor 10. In the pump device 1 of the present embodiment, fluid flowing through the pump chamber 20 is liquid. The pump device 1 is used, for example, under a condition in which an environmental temperature or a fluid temperature is likely to change.

The motor 10 includes an annular stator 3, a rotor 4 disposed on an inner side of the stator 3, a resin housing 6 that covers the stator 3, and a support shaft 5 that rotatably supports the rotor 4. The support shaft 5 is made of metal or ceramic. The impeller 25 rotates integrally with the rotor 4. As illustrated in FIG. 2, in the pump device 1, the impeller 25 and the pump chamber 20 are provided on the one side L1 in the axial direction with respect to the stator 3.

As illustrated in FIG. 2, the pump chamber 20 is provided between the case 2 and the housing 6. The case 2 constitutes a wall surface 23 on the one side L1 in the axial direction of the pump chamber 20 and a sidewall 29 extending in the circumferential direction. As illustrated in FIG. 1, the suction pipe 21 extends in the axial direction at the center in the radial direction of the case 2, and the suction pipe 21 extends from the sidewall 29 in a direction orthogonal to the rotation axis L of the motor 10.

As illustrated in FIG. 2, the stator 3 includes a stator core 31, an insulator 32 overlapping the stator core 31 from the one side L1 in the axial direction, an insulator 33 overlapping the stator core 31 from the other side L2 in the axial direction, and a plurality of coils 35 wound around a plurality of salient poles provided on the stator core 31 via the insulators 32 and 33. The motor 10 is a three-phase motor. Therefore, the plurality of coils 35 are constituted by a U-phase coil, a V-phase coil, and a W-phase coil.

The rotor 4 includes a rotor member 40 made of resin. The rotor member 40 includes a cylindrical portion 41 extending in the axial direction, and a flange portion 45 formed at an end portion on the one side L1 in the axial direction of the cylindrical portion 41. The cylindrical portion 41 extends from the inner side of the stator 3 in the radial direction toward the pump chamber 20 and opens in the pump chamber 20. A cylindrical drive magnet 8 is held on an outer peripheral surface of the cylindrical portion 41. The drive magnet 8 is opposed to the stator 3 on the inner side in the radial direction. The drive magnet 8 is formed of, for example, a neodymium bond magnet.

The vane wheel 24 is coupled to the flange portion 45 of the rotor member 40 from the one side L1 in the axial direction. In the present embodiment, the impeller 25 connected to the cylindrical portion 41 of the rotor member 40 is constituted by the flange portion 45 and the vane wheel 24. The vane wheel 24 includes a disc portion 26 that is opposed to the flange portion 45 in the axial direction, and a plurality of vane portions 261 that protrude from the disc portion 26 toward the other side L2 in the axial direction. The disc portion 26 is fixed to the flange portion 45 via the vane portions 261. A center hole 260 is formed at the center of the disc portion 26. The disc portion 26 is inclined in a direction toward the flange portion 45 as the disc portion 26 extends to the outer side in the radial direction. The plurality of vane portions 261 are disposed at equal angular intervals. Each of the vane portions 261 extends to the outer side in the radial direction while curving in an arc shape from the periphery of the center hole 260. The detailed shape of the vane portion 261 will be described below.

In the rotor member 40, a tubular radial bearing 11 is held on the inner side of the cylindrical portion 41 in the radial direction. The rotor 4 is rotatably supported by the support shaft 5 via the radial bearing 11. An end portion on the other side L2 in the axial direction of the support shaft 5 is held in a shaft hole 65 formed in a bottom wall 63 of the housing 6. The case 2 includes three support portions 27 extending from an inner peripheral surface of the suction pipe 21 toward the motor 10. A tube portion 28 in which the support shaft 5 is positioned is formed at an end portion of the support portion 27, and an end portion on the one side L1 in the axial direction of the support shaft 5 is held by the tube portion 28.

An annular thrust bearing 12 is mounted on an end portion on the one side L1 in the axial direction of the support shaft 5, and the thrust bearing 12 is disposed between the radial bearing 11 and the tube portion 28. Here, at least a part of the end portion of the support shaft 5 on the other side L2 and the shaft hole 65 has a D-shaped cross section. Further, the end portion of the support shaft 5 on the one side L1 and the hole of the thrust bearing 12 have a D-shaped cross section. Therefore, rotation of the support shaft 5 and the thrust bearing 12 with respect to the housing 6 is prevented.

The housing 6 is a resin sealing member 60 that covers the stator 3 from both sides in the radial direction and both sides in the axial direction. The resin sealing member 60 is made of polyphenylene sulfide (PPS). The stator 3 is integrated with the resin sealing member 60 by insert molding. The housing 6 is a partition wall member including a first partition wall portion 61 that is opposed to a wall surface 23 on the one side L1 in the axial direction of the pump chamber 20, a second partition wall portion 62 interposed between the stator 3 and the drive magnet 8, and the bottom wall 63 provided at an end of the second partition wall portion 62 on the other side L2. The housing 6 includes a cylindrical body portion 66 that covers the stator 3 from the outer side in the radial direction.

As illustrated in FIGS. 1 and 2, a cover 18 is fixed, from the other side L2 in the axial direction, to an end portion 64 on the other side L2 in the axial direction of the housing 6. As illustrated in FIG. 2, a substrate 19 provided with a circuit for controlling power supply to the coils 35 is disposed between the cover 18 and the bottom wall 63 of the housing 6. Metal winding terminals 71, which protrude from the stator 3 through the bottom wall 63 of the housing 6 to the other side L2 in the axial direction, are connected to the substrate 19 by soldering. The housing 6 includes a columnar portion that protrudes from the bottom wall 63 to the other side L2 in the axial direction. The substrate 19 is fixed to the columnar portion by a screw 91.

As illustrated in FIG. 1, the housing 6 includes a tubular connector housing 69 extending to the outer side in the radial direction from a body portion 66 surrounding an outer peripheral side of the stator 3. A connector terminal whose one end is connected to the substrate 19 is disposed inside the connector housing 69. When a connector is coupled to the connector housing 69, a drive current generated by a circuit mounted on the substrate 19 is supplied to each of the coils 35 via the winding terminals 71. As a result, the rotor 4 rotates around the rotation axis L of the motor 10. Thus, the impeller 25 rotates in the pump chamber 20 and pressure in the pump chamber 20 becomes negative, so that the fluid is sucked into the pump chamber 20 from the suction pipe 21 and discharged from the discharge pipe 22.

Holding Structure of Drive Magnet and Radial Bearing

Figure 3:
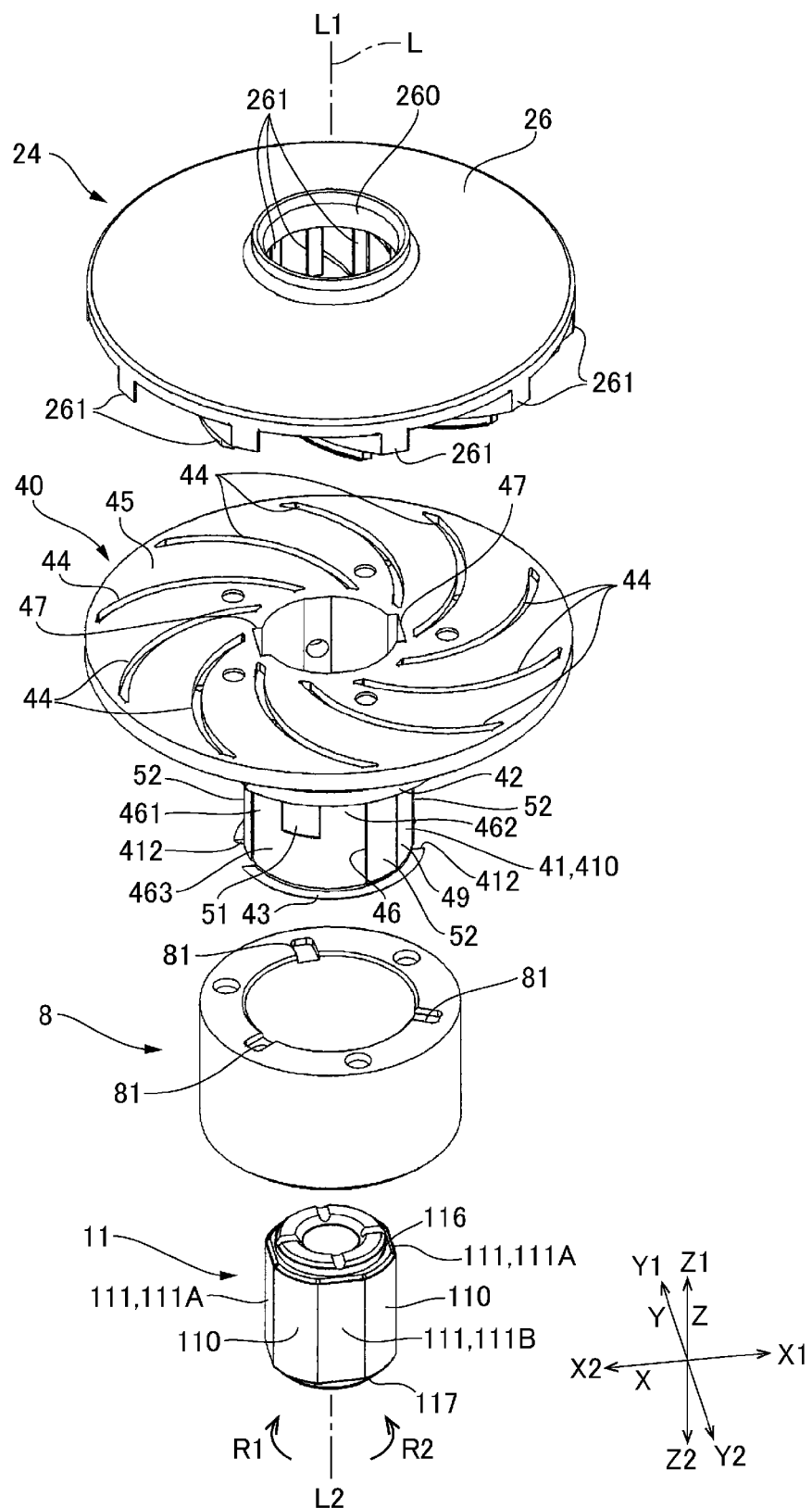
FIG. 3 is an exploded perspective view of a rotor and a radial bearing as viewed from one side in an axial direction.
Figure 4:
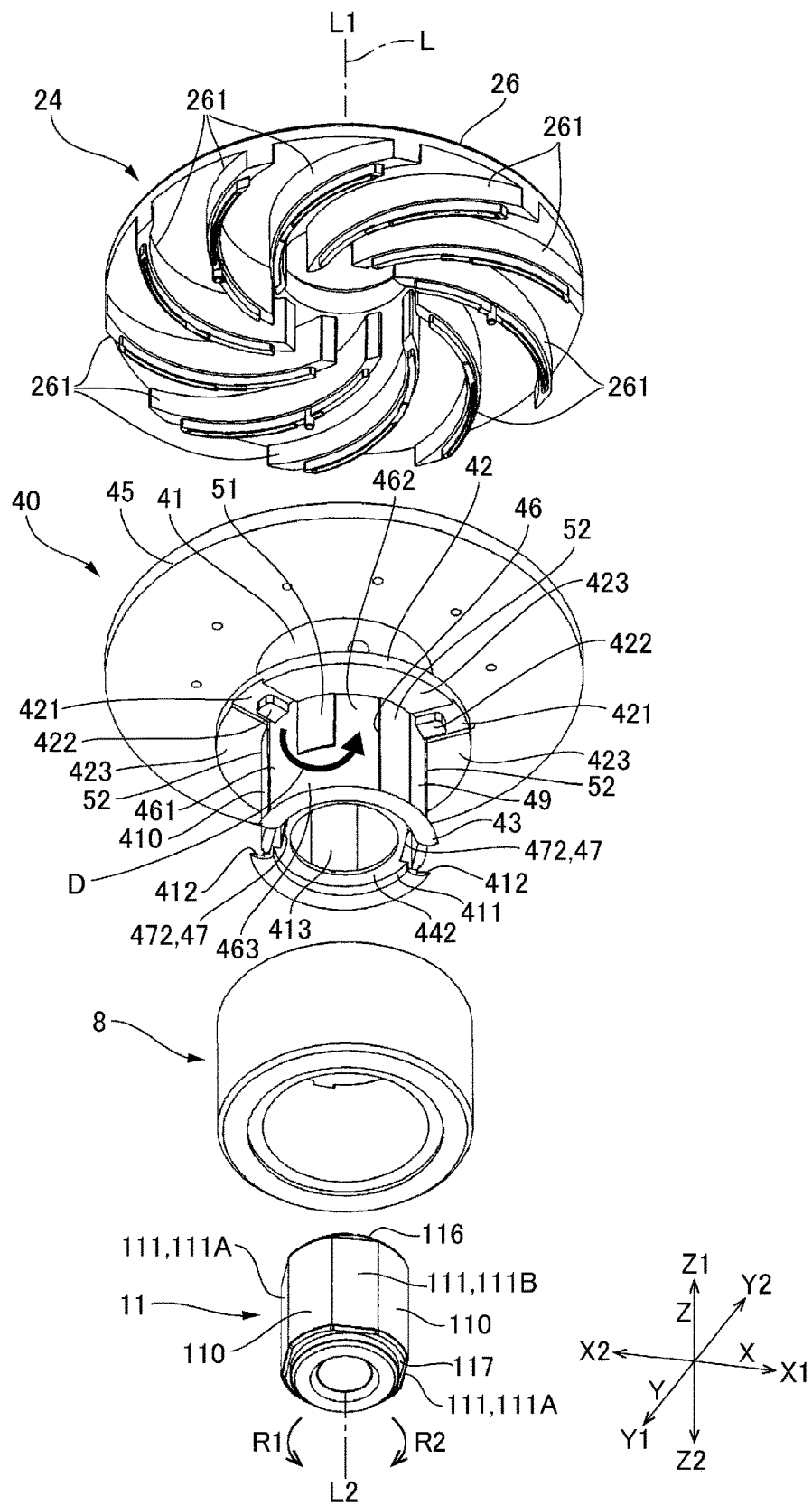
FIG. 4 is an exploded perspective view of the rotor and the radial bearing as viewed from another side in the axial direction.
Figure 5:
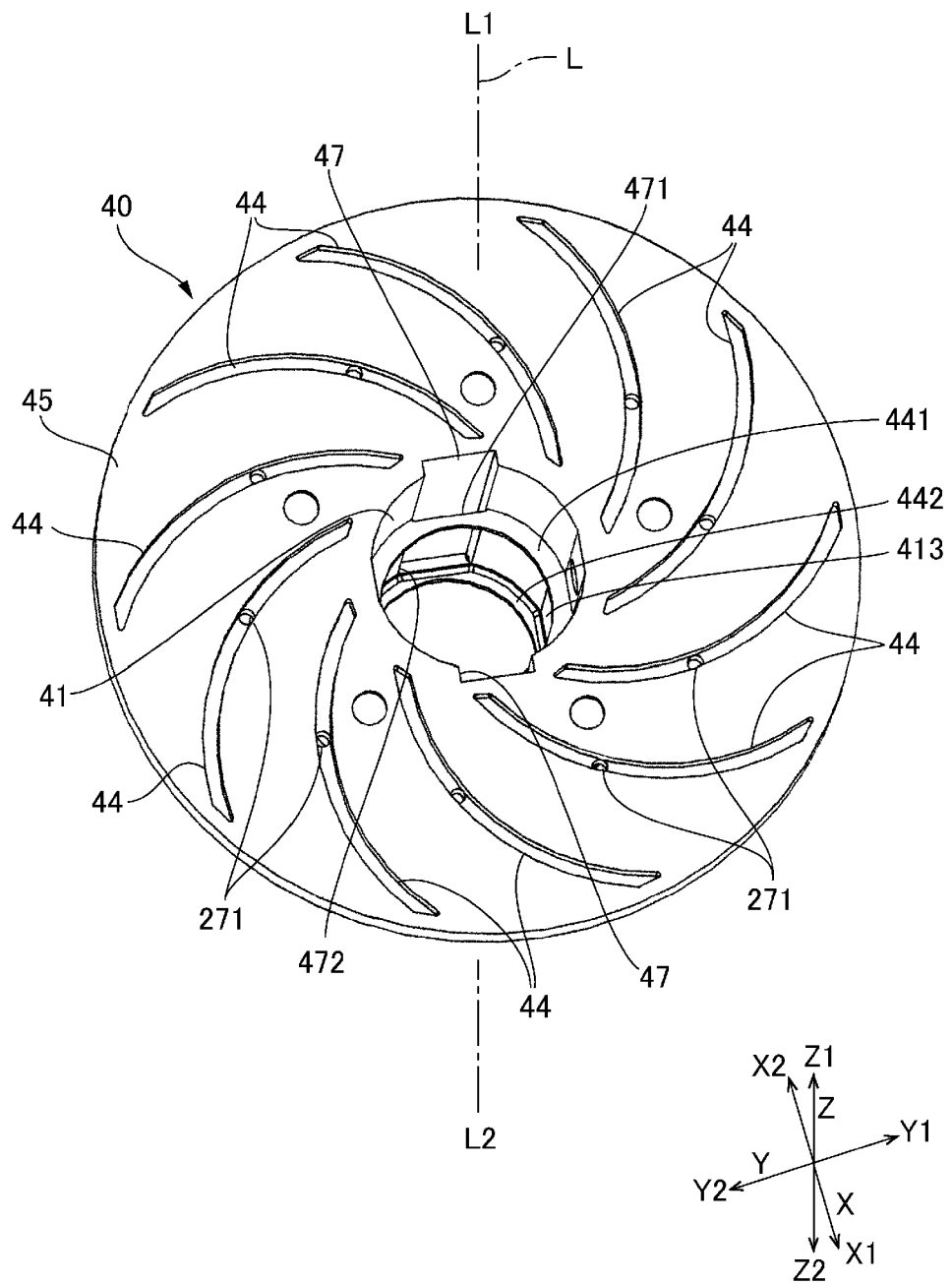
FIG. 5 is a perspective view of a rotor member as viewed from the one side in the axial direction.
Figure 6:
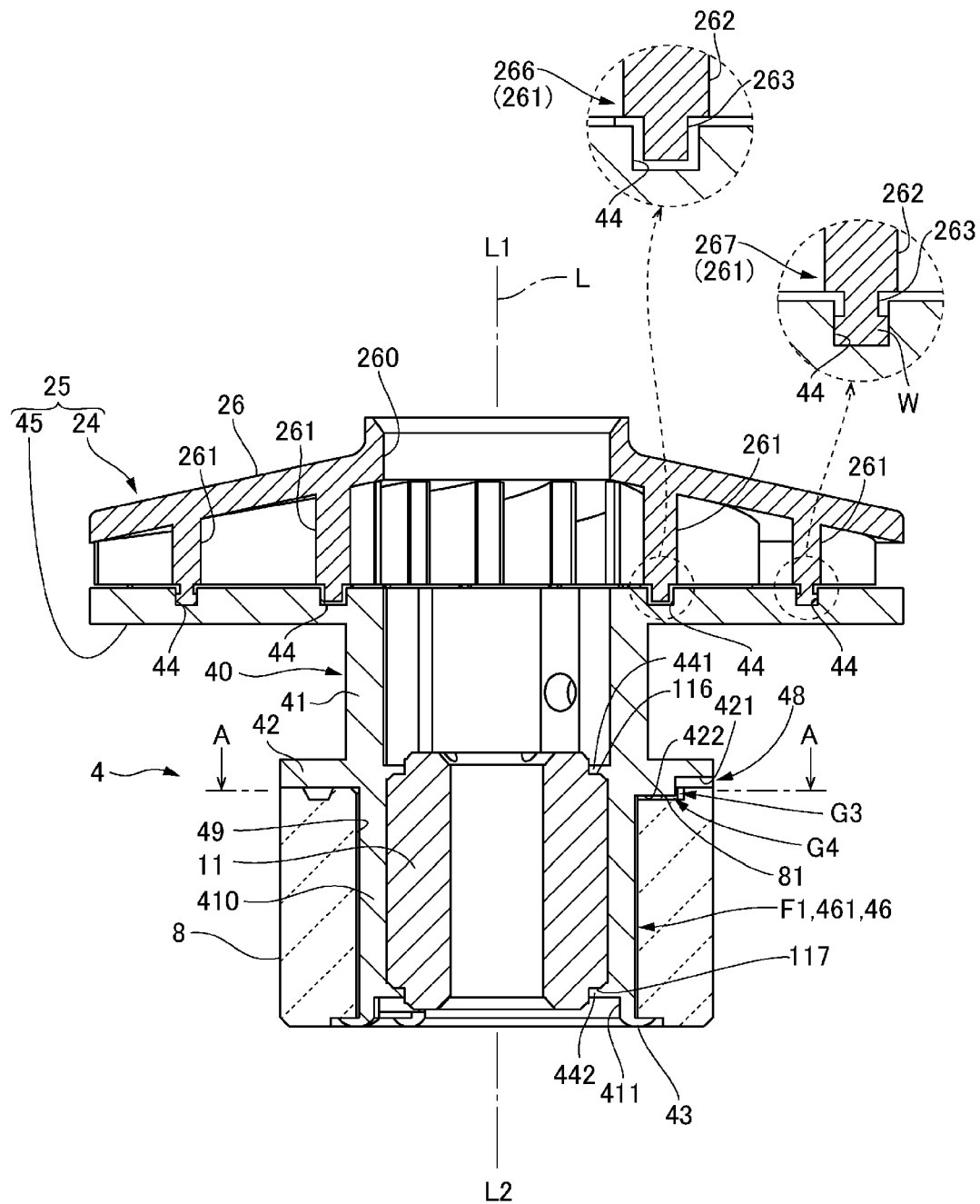
FIG. 6 is a cross-sectional view of the rotor, a vane wheel, and the radial bearing taken along a plane including the rotation axis (position B-B in FIG. 7)
Figure 7:
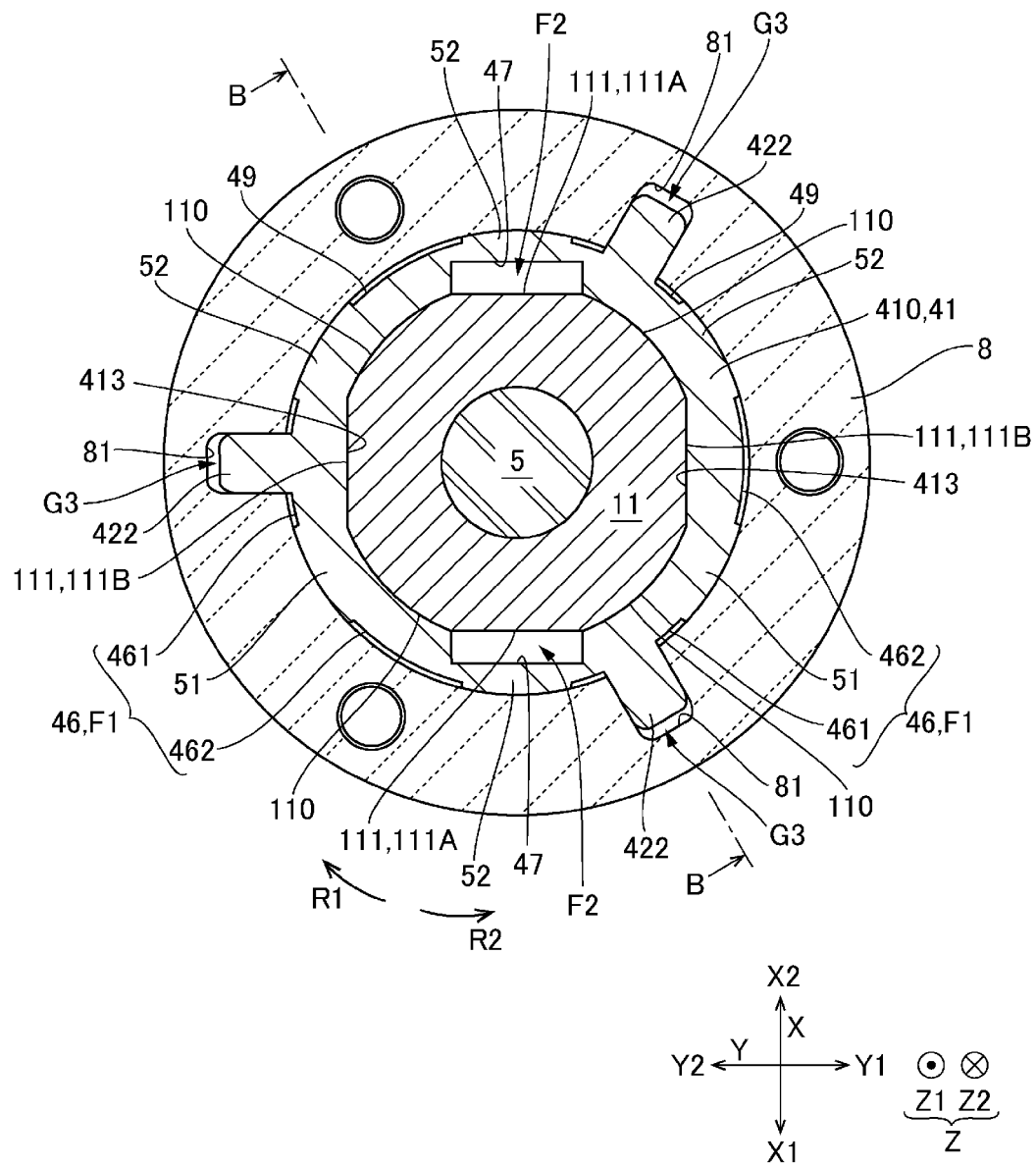
FIG. 7 is a cross-sectional view of the rotor, the radial bearing, and a support shaft taken along a plane perpendicular to the rotation axis (a cross-sectional view taken along position A-A in FIG. 6)
Figure 8:
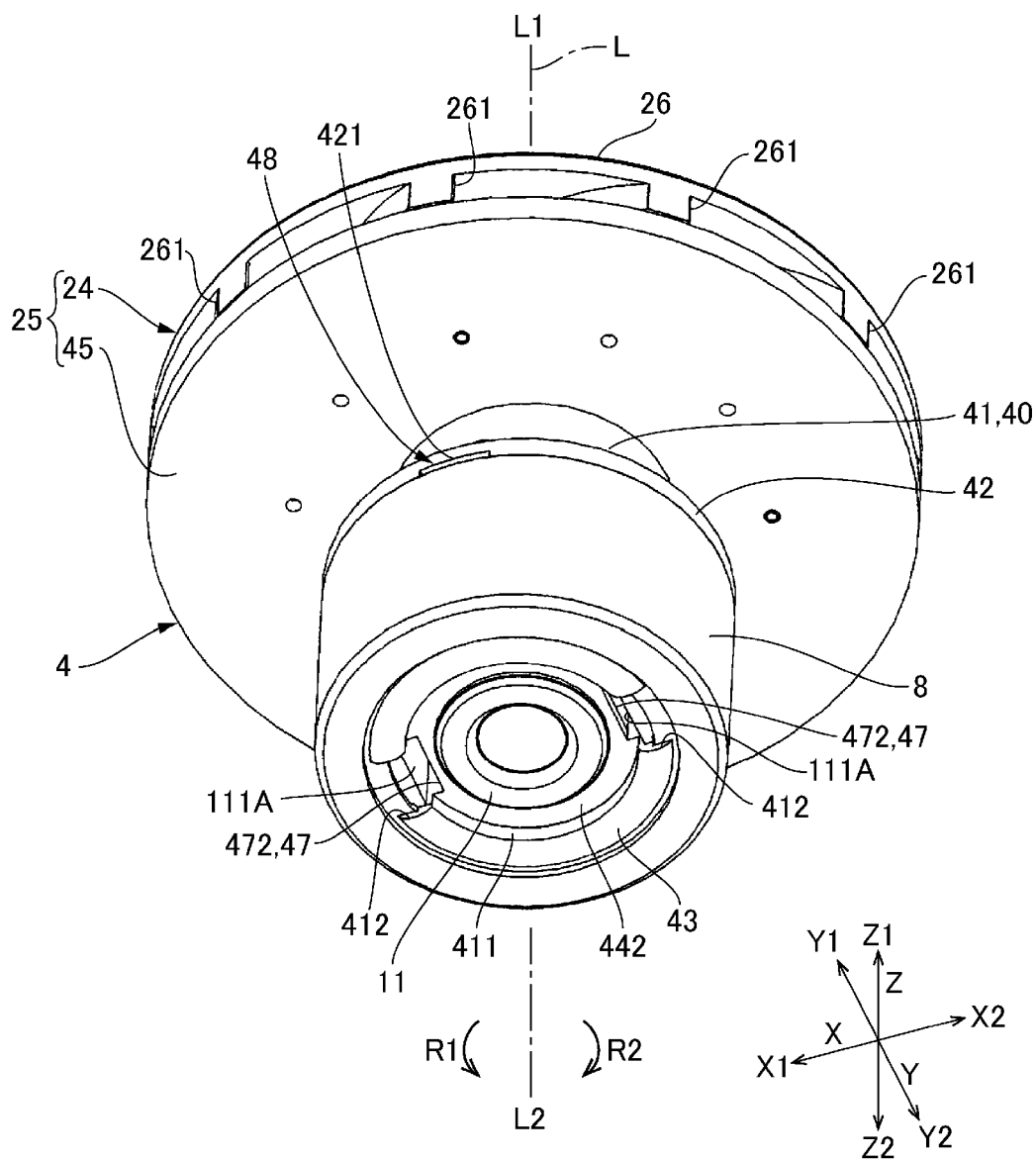
FIG. 8 is a perspective view of the rotor, the vane wheel, and the radial bearing as viewed from the other side in the axial direction.

FIG. 3 is an exploded perspective view of the rotor 4 and the radial bearing 11 as viewed from the one side L1 in the axial direction. FIG. 4 is an exploded perspective view of the rotor 4 and the radial bearing 11 as viewed from the other side L2 in the axial direction. FIG. 5 is a perspective view of the rotor member 40 as viewed from the one side L1 in the axial direction. FIG. 6 is a cross-sectional view of the rotor 4, the vane wheel 24, and the radial bearing 11 taken along a plane including the rotation axis L. FIG. 7 is a cross-sectional view of the rotor 4, the radial bearing 11, and the support shaft 5 taken along a plane perpendicular to the rotation axis L (a cross-sectional view taken along the line A-A in FIG. 6). FIG. 8 is a perspective view of the rotor 4, the vane wheel 24, and the radial bearing 11 as viewed from the other side L2 in the axial direction.

In the present specification, three directions of XYZ are directions orthogonal to each other. One side in the X direction is referred to as X1, the other side in the X direction as X2, one side in the Y direction as Y1, the other side in the Y direction as Y2, one side in the Z direction as Z1, the other side in the Z direction as Z2. The Z direction coincides with the axial direction, the Z1 direction coincides with the one side L1 in the axial direction, and the Z2 direction coincides with the other side L2 in the axial direction.

As illustrated in FIGS. 2 and 4, the rotor member 40 includes an annular seat portion 42 that protrudes to the outer side in the radial direction from the cylindrical portion 41 at a position spaced apart from the flange portion 45 toward the other side L2. The cylindrical portion 41 includes a magnet holding portion 410 extending from the seat portion 42 toward the other side L2. The magnet holding portion 410 is fitted inside the drive magnet 8 to hold the drive magnet 8. At this time, the seat portion 42 supports an end portion on the one side L1 in the axial direction of the drive magnet 8. A caulking portion 43 overlapping with the drive magnet 8 in the axial direction is formed at an end portion on the other side L2 in the axial direction of the magnet holding portion 410.

As illustrated in FIGS. 5 and 6, an annular first convex portion 441 and an annular second convex portion 442 that protrude to the inner side in the radial direction are formed on an inner peripheral surface of the cylindrical portion 41. The first convex portion 441 is disposed on a step portion 116 on the one side L1 in the axial direction of the radial bearing 11. The second convex portion 442 is disposed on a step portion 117 on the other side L2 in the axial direction of the radial bearing 11. When being manufactured, the rotor member 40 is manufactured as a resin molded product with the radial bearing 11 insert molded therein. Thus, the radial bearing 11 can be held between the first convex portion 441 and the second convex portion 442.

As illustrated in FIGS. 4 and 6, the end portion on the other side L2 in the axial direction of the magnet holding portion 410 includes a protruding portion 411 extending toward the other side L2 with respect to the second convex portion 442, and the caulking portion 43 is formed at a tip end of the protruding portion 411. As illustrated in FIG. 4, the protruding portion 411 includes cutout portions 412 that are formed on the one side L1 in the axial direction by cutting out two portions on opposite sides in the radial direction. One cutout portion 412 is provided at an angular position in the X1 direction with respect to the rotation axis L, and the other cutout portion 412 is provided at an angular position in the X2 direction with respect to the rotation axis L. In the present embodiment, the caulking portion 43 extends in an arc shape except for portions where the cutout portions 412 are formed.

As illustrated in FIG. 4, the seat portion 42 of the rotor member 40 includes concave portions 421 that are recessed to the one side L1 in the axial direction, and rotation regulating protrusions 422 that protrude from bottom surfaces of the respective concave portions 421 toward the other side L2 in the axial direction. The concave portions 421 are provided at a plurality of positions at equal angular intervals (three positions at intervals of 120 degrees in the present embodiment). Portions between the concave portions 421 adjacent to each other in the circumferential direction are flat portions 423 perpendicular to the axial direction.

The concave portion 421 extends from an inner edge to an outer edge of the seat portion 42. The rotation regulating protrusion 422 is disposed at the center in the circumferential direction of the concave portion 421 and extends from the inner edge of the seat portion 42 to an intermediate position in the radial direction of the seat portion 42. Therefore, both sides in the circumferential direction and an outer side in the radial direction of the rotation regulating protrusion 422 are surrounded by the concave portion 421. The height of the rotation regulating protrusion 422 in the axial direction is larger than the depth of the concave portion 421 in the axial direction. Therefore, the rotation regulating protrusion 422 protrudes to a position on the other side L2 in the axial direction with respect to the flat portion 423.

When the drive magnet 8 is fixed to the magnet holding portion 410, the end portion on the one side L1 in the axial direction of the drive magnet 8 is brought into contact with the flat portion 423 of the seat portion 42 from the other side L2 in the axial direction. At this time, the rotation regulating protrusions 422 are fitted into rotation regulating concave portions 81 (see FIG. 3) formed in an end surface on the one side L1 in the axial direction of the drive magnet 8. Thus, an angular position of the drive magnet 8 in the circumferential direction is defined, and rotation of the drive magnet 8 with respect to the rotor member 40 is prevented.

Flow Passage for Cooling Drive Magnet and Radial Bearing

As illustrated in FIGS. 3 and 4, the rotor member 40 includes first flow passage grooves 46 formed in an outer peripheral surface of the magnet holding portion 410 of the cylindrical portion 41. The first flow passage grooves 46 each are a concave portion that is recessed to the inner side in the radial direction to a certain depth. When the magnet holding portion 410 is fitted inside the drive magnet 8, flow passages F1 (see FIG. 7) having a shape defined by the first flow passage grooves 46 are formed between an inner peripheral surface of the drive magnet 8 and the magnet holding portion 410. The flow passages F1 communicate with a gap G1 (see FIG. 2) between the drive magnet 8 and the second partition wall portion 62 of the housing 6. Therefore, the fluid in the pump chamber 20 flows through the flow passages F1 via the gap G1, so that the drive magnet 8 and the magnet holding portion 410 are cooled. That is, the flow passages F1 function as magnet cooling flow passages.

As illustrated in FIG. 5, the rotor member 40 includes second flow passage grooves 47 formed in the inner peripheral surface of the cylindrical portion 41. The second flow passage grooves 47 each are a groove portion having a rectangular cross section extending in the axial direction. The second flow passage grooves 47 each extend to the end portion on the one side L1 in the axial direction of the cylindrical portion 41, open at an inner peripheral edge of the flange portion 45, and communicate with the pump chamber 20. On the inner side of the cylindrical portion 41, rectangular opening portions 471 and 472 which penetrate the first convex portion 441 and the second convex portion 442 respectively are formed at the same angular position as the second flow passage groove 47.

As illustrated in FIGS. 4 and 5, the second flow passage grooves 47 are formed at two positions on opposite sides in the radial direction on the inner peripheral surface of the cylindrical portion 41. In the present embodiment, the second flow passage grooves 47 are disposed at two positions opposed to each other in the X direction. The angular positions of the two second flow passage grooves 47 coincide with the angular positions of the two cutout portions 412 formed by cutting out the end portion on the other side L2 of the cylindrical portion 41. Therefore, as illustrated in FIGS. 4 and 8, at an end portion on the other side L2 in the axial direction of the cylindrical portion 41, the opening portion 472 through which the second convex portion 442 passes is disposed on the inner side in the radial direction of each of the two cutout portions 412, and an outer side in the radial direction of the opening portion 472 is not closed by the caulking portion 43.

As illustrated in FIGS. 3, 4, and 7, planar portions 111 extending in the axial direction are provided at a plurality of positions in the circumferential direction on an outer peripheral surface of the radial bearing 11. The planar shape of the radial bearing 11 when viewed from the axial direction is a shape in which arc surfaces 110 and the planar portions 111 extending in the circumferential direction are alternately disposed in the circumferential direction. The planar portions 111 are formed at four positions at angular intervals of 90 degrees, and extend to both ends in the axial direction of the radial bearing 11. The four planar portions 111 include first planar portions 111A extending in the Y direction at two positions opposed to each other in the X direction and second planar portions 111B extending in the X direction at two positions opposed to each other in the Y direction. A width in the circumferential direction of the first planar portion 111A is equal to that of the second planar portion 111B.

The two first planar portions 111A are disposed at the same angular positions as the second flow passage grooves 47. When the radial bearing 11 are held inside the cylindrical portion 41, as illustrated in FIG. 7, flow passages F2 (see FIG. 7) extending in the axial direction are formed between the inner peripheral surface of the cylindrical portion 41 and the outer peripheral surface of the radial bearing 11 by the second flow passage grooves 47 and the planar portions 111. An end portion on the one side L1 in the axial direction of the flow passage F2 extends to the flange portion 45 and communicates with the pump chamber 20. An end portion on the other side L2 in the axial direction of the flow passage F2 is opened at the end portion on the other side L2 of the cylindrical portion 41 by the opening portion 472 provided in the second convex portion 442 and the cutout portion 412 provided in the protruding portion 411 (see FIG. 8). Therefore, the flow passages F2 communicate with the gap G2 (see FIG. 2) between the drive magnet 8 and the bottom wall 63 of the housing 6 via the opening portion 472 and the cutout portion 412. Thus, the fluid in the pump chamber 20 flows through the flow passages F2, so that the radial bearing 11 and the cylindrical portion 41 are cooled. That is, the flow passages F2 function as bearing cooling flow passages.

As illustrated in FIG. 7, rotation regulating planar portions 413 extending in the axial direction are provided at two positions opposed to each other in the Y direction on the inner peripheral surface of the cylindrical portion 41. When the radial bearing 11 is held inside the cylindrical portion 41, the rotation regulating planar portions 413 abut on the second planar portions 111B. Therefore, rotation of the radial bearing 11 with respect to the rotor 4 is prevented. As described above, in the present embodiment, when being manufactured, the rotor member 40 is manufactured as a resin molded product with the radial bearing 11 insert molded therein. At this time, resin is filled around the radial bearing 11 in a state where mold pins that correspond to the cross-sectional shapes of the second flow passage grooves 47 are set so as to abut on the first planar portions 111A of the radial bearing 11, and in a state where the second planar portions 111B are exposed in the mold. Thus, the second flow passage grooves 47, the opening portions 471 and 472, and the rotation regulating planar portions 413 are formed in the cylindrical portion 41 of the rotor member 40.

The second flow passage grooves 47 each are a groove having a rectangular cross section in which the groove width in the Y direction is larger than the groove depth in the X direction. A width in the circumferential direction of the first planar portion 111A is equal to a groove width of the second flow passage groove 47. The mold pin used for forming the second flow passage groove 47 is a mold pin having a rectangular cross section in which the circumferential direction of the rotor member 40 is a long side direction.

Detailed Configuration of Flow Passage Groove in Rotor Member

AR1 direction illustrated in FIGS. 3, 4, and 7 is a front side in the rotation direction of the rotor 4, and a R2 direction is a rear side in the rotation direction of the rotor 4. As illustrated in FIG. 4, the first flow passage groove 46 includes a first groove portion 461 extending in the axial direction, a second groove portion 462 extending in the axial direction on the rear side R2 in the rotation direction of the rotor 4 with respect to the first groove portion 461, and a third groove portion 463 extending in the circumferential direction and connecting end portions on the other side L2 in the axial direction of the first groove portion 461 and the second groove portion 462. That is, the first flow passage groove 46 is a groove having a shape folded back once in the axial direction, and is a substantially U-shaped groove.

As illustrated in FIG. 4, the concave portion 421 is formed in the seat portion 42 of the rotor member 40. As illustrated in FIG. 8, when the drive magnet 8 is fixed to the magnet holding portion 410 of the rotor member 40, an inflow port 48 that opens to the outer side in the radial direction is formed between the end surface on the one side L1 in the axial direction of the drive magnet 8 and the bottom surface of the concave portion 421. As illustrated in FIG. 4, since a position in the circumferential direction of the concave portion 421 coincides with that of the first groove portion 461, the first groove portion 461 and the gap G1 (see FIG. 2) on an outer peripheral side of the drive magnet 8 communicate with each other via the inflow port 48.

As illustrated in FIG. 7, the rotation regulating concave portion 81 formed in the drive magnet 8 is longer in radial dimension than the rotation regulating protrusion 422. Therefore, a gap G3 serving as a flow passage is formed between a side surface on the outer side in the radial direction of the rotation regulating protrusion 422 and an inner side surface of the rotation regulating concave portion

81. As illustrated in FIG. 6, a depth in the axial direction of the rotation regulating concave portion 81 is dimensioned such that a gap G4 in the axial direction is formed between the rotation regulating concave portion 81 and the rotation regulating protrusion 422. Therefore, the fluid that has flowed in from the inflow port 48 not only flows on both sides in the circumferential direction of the rotation regulating protrusion 422, but also flows into the first groove portion 461 via the gaps G3 and G4.

As illustrated in FIG. 4, in the first flow passage groove 46, the third groove portion 463 and the second groove portion 462 are provided on the rear side R2 in the rotation direction with respect to the first groove portion 461 communicating with the inflow port 48. Therefore, when the rotor 4 rotates in the R1 direction, the fluid in the first groove portion 461 moves in the R2 direction due to inertia force and flows through the third groove portion 463 and the second groove portion 462, and a flow in the D direction illustrated in FIG. 4 is generated. Thus, pressure in the first groove portion 461 becomes negative, and the fluid further flows in. That is, while the rotor 4 rotates, the fluid continues to flow through the first flow passage groove 46 in the direction D illustrated in FIG. 4.

As illustrated in FIGS. 3, 4, and 7, on the outer peripheral surface of the magnet holding portion 410, portions between the first groove portions 461 and the second groove portions 462 adjacent to each other in the circumferential direction are first ribs 51 extending in the axial direction from the seat portion 42 to the third groove portion 463. Since a portion of the seat portion 42 on the outer side in the radial direction of the second groove portion 462 is the flat portion 423 that supports the drive magnet 8, a wide opening portion such as the inflow port 48 is not formed on the outer side in the radial direction of the second groove portion 462 (see FIG. 8). Therefore, a differential pressure is generated between the inflow side and the outflow side of the first flow passage groove 46, so that the fluid easily flows into the first flow passage groove 46.

As illustrated in FIG. 7, on the outer peripheral surface of the magnet holding portion 410, the first flow passage grooves 46 are formed at two positions side by side in the circumferential direction. Further, two third flow passage grooves 49 extending in the axial direction and having the same widths as those of the first groove portion 461 and the second groove portion 462 are formed side by side in a region (region in the X2 direction) of the outer peripheral surface of the magnet holding portion 410 where the first flow passage grooves 46 are not formed. The third flow passage grooves 49 extend to the end portion on the other side L2 in the axial direction of the cylindrical portion 41.

As illustrated in FIG. 7, two of the three concave portions 421 formed in the seat portion 42 are provided at angular positions corresponding to the first groove portion 461 of the first flow passage groove 46. On the other hand, the remaining one concave portion 421 is provided at an angular position corresponding to one of the two third flow passage grooves 49. Therefore, the fluid flows into one of the two third flow passage grooves 49 via the inflow port 48 formed between the concave portion 421 and the drive magnet 8.

As illustrated in FIGS. 3 and 4, second ribs 52 extending in the axial direction in a range from the seat portion 42 to the caulking portion 43 are provided on the outer peripheral surface of the magnet holding portion 410. The second ribs 52 are provided between the first groove portions 461 adjacent to each other in the circumferential direction, between the third flow passage grooves 49 adjacent to each other in the circumferential direction, and between the first groove portion 461 and the third flow passage groove 49 adjacent to each other in the circumferential direction. Therefore, four second ribs 52 are formed on the outer peripheral surface of the magnet holding portion 410.

Two of the four second ribs 52 are provided at angular positions opposite to each other in the X direction with respect to the rotation axis L, and circumferential positions of the two second ribs 52 coincide with those of the second flow passage grooves 47 provided on the inner peripheral surface of the cylindrical portion 41. The first ribs 51 and the second ribs 52 are protruding portions that protrude to the outer side in the radial direction from bottom surfaces of the first flow passage grooves 46 and the third flow passage grooves 49. Therefore, since the angular positions of the second flow passage grooves 47 coincide with the angular positions of the second ribs 52 respectively, wall thicknesses of the magnet holding portion 410 at portions where the second flow passage grooves 47 are formed can be secured.

Fixing Structure of Vane Wheel

Figure 9:
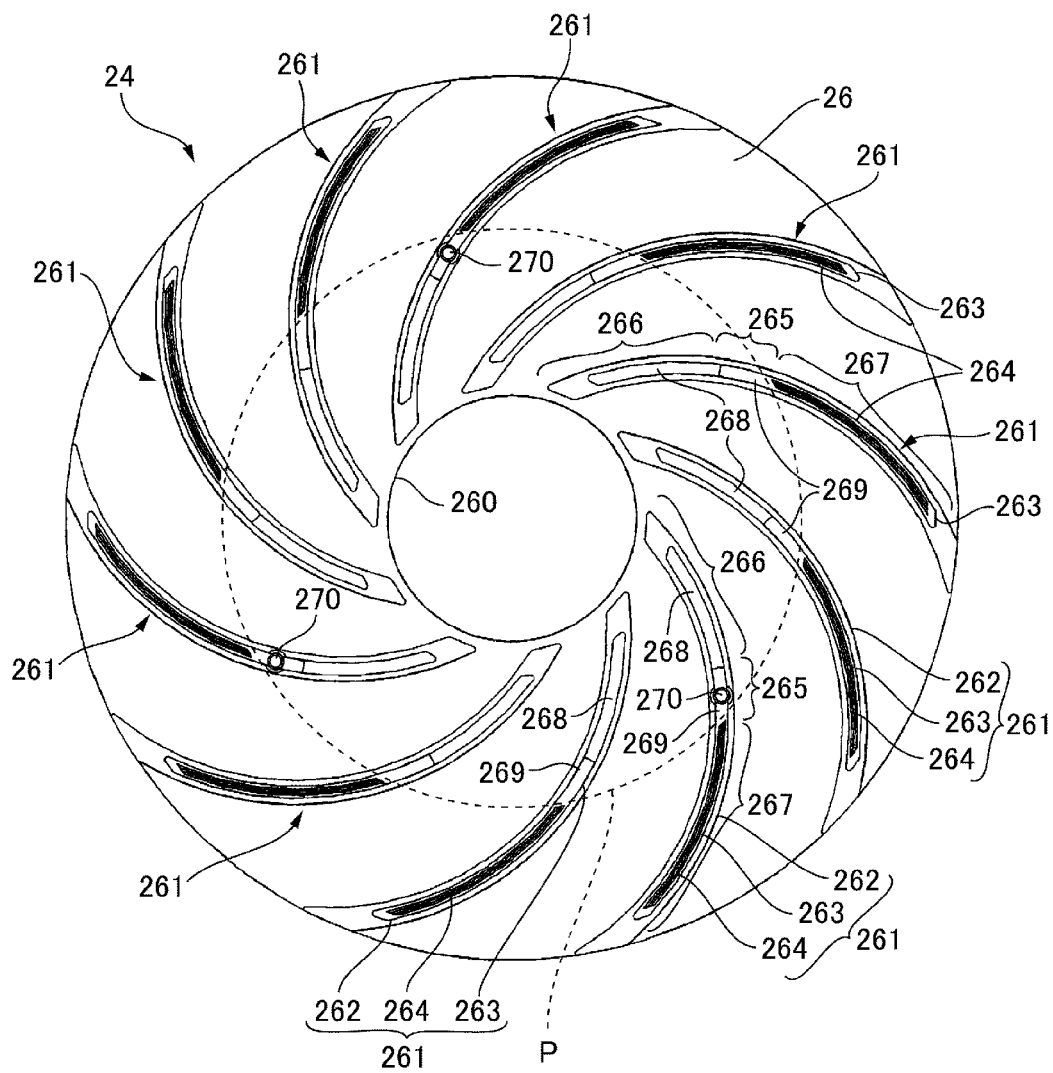
FIG. 9 is a plan view of the vane wheel as viewed from the one side in the axial direction.
Figure 10:
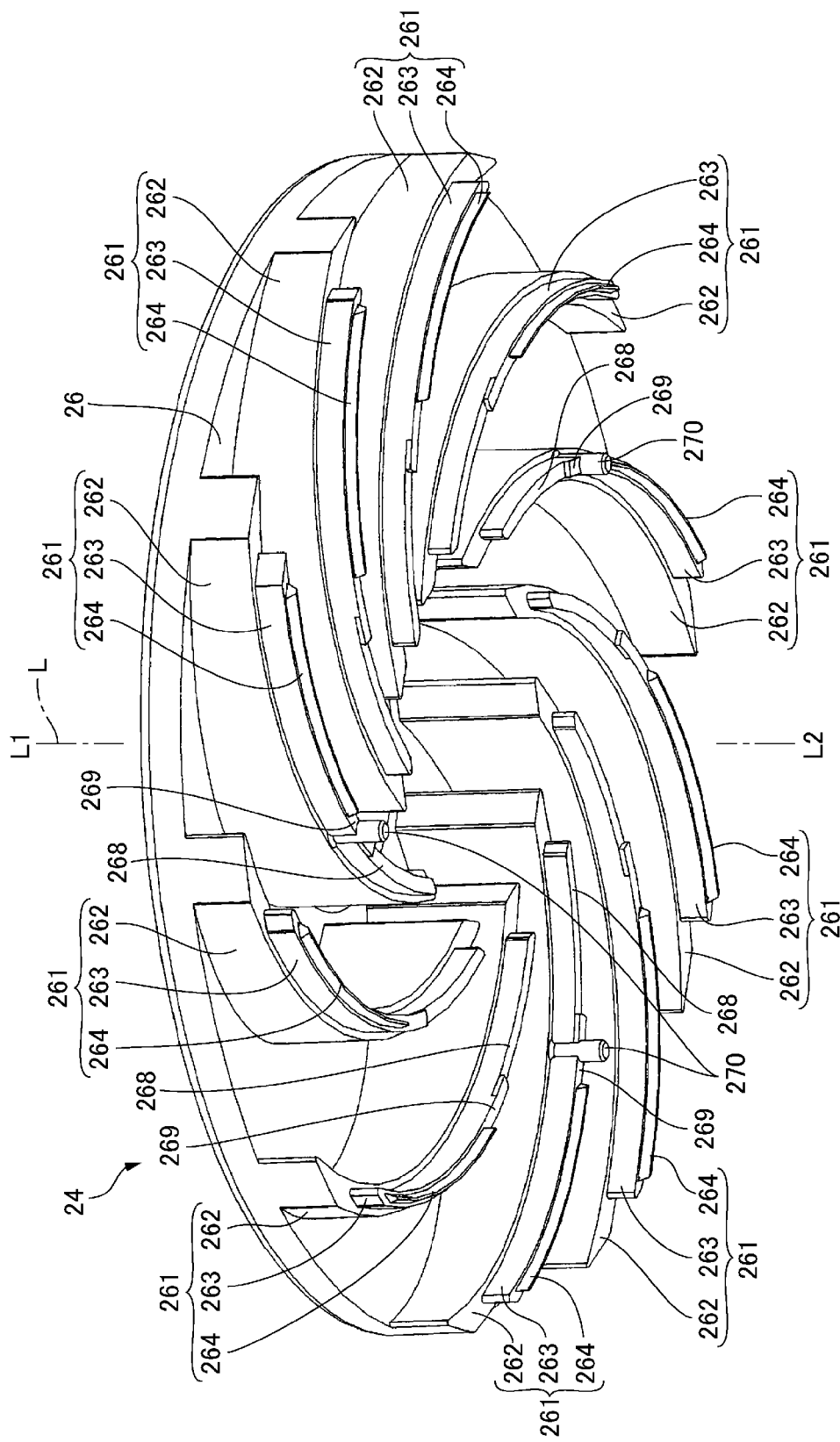
FIG. 10 is a perspective view of the vane wheel as viewed from the one side in the axial direction.

FIG. 9 is a plan view of the vane wheel 24 as viewed f from the one side L1 in the axial direction. FIG. 10 is a perspective view of the vane wheel 24 as viewed from the one side L1 in the axial direction. As illustrated in FIGS. 2 and 6, in the present embodiment, the impeller 25 that rotates integrally with the rotor 4 is configured by coupling the vane wheel 24 to the flange portion 45 of the rotor member 40. As illustrated in FIGS. 5 and 6, the flange portion 45 is provided with a plurality of fixing grooves 44 recessed into the other side L2 in the axial direction. The plurality of fixing grooves 44 are provided at positions at equal angular intervals in the circumferential direction around the rotation axis L. In the present embodiment, ten fixing grooves 44 having identical shapes are provided on the flange portion 45. Each fixing groove 44 extends to the outer side in the radial direction while being curved in an arc shape. Each fixing groove 44 extends from a vicinity of the inner peripheral edge of the flange portion 45 to a vicinity of the outer peripheral edge.

As illustrated in FIG. 6, tip ends of the vane portions 261 protruding from the disc portion 26 toward the other side L2 in the axial direction are inserted into the fixing grooves 44. The vane wheel 24 is fixed to the flange portion 45 by welding the tip ends of the vane portions 261 to the fixing grooves 44. In the present embodiment, welded portions W welded to the fixing grooves 44 are formed in portions on the outer side in the radial direction (outer peripheral portions 267 to be described below) of the vane portions 261.

The vane wheel 24 is provided with ten vane portions 261 at positions opposed to the fixing grooves 44 in the axial direction. As illustrated in FIGS. 9 and 10, each of the vane portions 261 includes a vane portion main body 262 protruding from the disc portion 26, a rib 263 protruding from a tip end surface of the vane portion main body 262, and a welding convex portion 264 protruding from a tip end surface of the rib 263. The welding convex portion 264 has a substantially triangular cross-sectional shape, and has a shape in which the thickness decreases toward a tip end thereof. The welded portion W illustrated in FIG. 6 is a crushed portion where the welding convex portion 264 is crushed by a bottom surface of the fixing groove 44. A thickness of the vane portion main body 262 is larger than a width of the fixing groove 44, but a thickness of the rib 263 is smaller than the width of the fixing groove 44. Further, a thickness of the welding convex portion 264 is smaller than the thickness of the rib 263. Therefore, a gap capable of accommodating welding burrs is secured around the rib 263 and the welding convex portion 264 that are inserted into the fixing groove 44.

As illustrated in FIGS. 9 and 10, each vane portion 261 includes an intermediate portion 265 including a central position P in the radial direction of each vane portion 261, an inner peripheral portion 266 extending to the inner side in the radial direction from the intermediate portion 265, and an outer peripheral portion 267 extending to the outer side in the radial direction from the intermediate portion 265. The inner peripheral portion 266 extends from the intermediate portion 265 to an end portion on the inner side in the radial direction of the vane portion 261. The outer peripheral portion 267 extends from the intermediate portion 265 to an end portion on the outer side in the radial direction of the vane portion 261. The welding convex portion 264 is formed at the outer peripheral portion 267, and is not formed at the intermediate portion 265 and the inner peripheral portion 266.

Each vane portion 261 has a shape in which a height of the inner peripheral portion 266 in the axial direction is lower than heights of the intermediate portion 265 and the outer peripheral portion 267 in the axial direction. In each vane portion 261, the tip end surface of the rib 263 is on the same surface having a fixed height in the axial direction in a range from the intermediate portion 265 to the outer peripheral portion 267, but the tip end surface of the rib 263 at the inner peripheral portion 266 is a step surface 268 recessed from the tip end surface of the rib 263 in the range from the intermediate portion 265 to the outer peripheral portion 267.

In each vane portion 261, the tip end surface of the rib 263 at the intermediate portion 265 is not formed with the welding convex portion 264, and is a flat surface. The tip end surface of the rib 263 at the intermediate portion 265 is a reference surface 269 that abuts on the flange portion 45 in the axial direction. In the present embodiment, when the vane wheel 24 is assembled to the flange portion 45, the tip end surface (the reference surface 269) of the rib 263 at the intermediate portion 265 is made to abut on the bottom surface of the fixing groove 44. Thus, the vane wheel 24 is positioned in the axial direction.

Some of the ten vane portions 261 provided in the vane wheel 24 are provided with positioning convex portions 270 protruding from the reference surface 269 to the other side L2 in the axial direction. In the present embodiment, three of the ten vane portions 261 include the positioning convex portions 270. Three positioning convex portions 270 are dispersedly arranged in the circumferential direction. As illustrated in FIG. 5, in the flange portion 45, positioning concave portions 271 are provided in all of the ten fixing grooves 44. When the vane wheel 24 is coupled to the flange portion 45, the three positioning convex portions 270 are fitted into the positioning concave portions 271 of the opposing fixing grooves 44.

Main Effects of the Present Embodiment

As described above, the pump device 1 of the present embodiment includes the motor 10 including the rotor 4 and the stator 3, and the impeller 25 that is disposed, when the direction along the rotation axis L of the rotor 4 is defined as the axial direction, in the pump chamber 20 provided on the one side L1 in the axial direction with respect to the stator 3 and rotates integrally with the rotor 4. The rotor 4 includes a rotor member 40 having the magnet holding portion 410 in a tubular shape, and the drive magnet 8 fixed to the outer peripheral surface of the magnet holding portion 410. The impeller 25 includes the flange portion 45 provided at the end portion on the one side L1 in the axial direction of the rotor member 40, and a vane wheel 24 fixed to the flange portion 45 from the one side L1 in the axial direction. The vane wheel 24 includes the disc portion 26 that is opposed to the flange portion 45 in the axial direction, and the plurality of vane portions 261 that protrude from the disc portion 26 toward the other side L2 in the axial direction. The plurality of vane portions 261 extend to the outer side in the radial direction at a plurality of positions in the circumferential direction around the rotation axis L, and at the tip end on the other side L2 in the axial direction of each of the plurality of vane portions 261, the rib 263 that is inserted into the fixing groove 44 provided in the flange portion 45 is provided. The rib 263 includes the inner peripheral portion 266 including the end portion on the inner side in the radial direction of the rib 263, and the outer peripheral portion 267 including the end portion on the outer side in the radial direction portion of the rib 263. A gap in the axial direction is provided between a tip end on the other side L2 in the axial direction of the inner peripheral portion 266 and the bottom surface of the fixing groove 44, and the welded portion W welded to the fixing groove 44 is provided at a tip end on the other side L2 in the axial direction of the outer peripheral portion 267.

According to the present embodiment, by inserting the ribs 263 provided at the tip ends of the vane portions 261 into the fixing grooves 44 provided in the flange portion 45, it is possible to suppress deformation of the vane portions 261 due to water pressure. In addition, it is possible to suppress a decrease in efficiency due to the fluid passing between the tip ends of the vane portions 261 and the flange portion 45. Further, the rib 263 inserted into the fixing groove 44 has a shape in which the outer peripheral portion 267 is welded to the fixing groove 44, while the inner peripheral portion 266 forms a gap with the bottom surface of the fixing groove 44. Therefore, even in a case where the flange portion 45 is not formed into a designed shape and is curved into an umbrella shape, the inner peripheral portion 266 of the rib 263 is less likely to excessively interfere with the bottom surface of the fixing groove 44. Therefore, a large number of welding burrs are less likely to be generated at the excessively interfering portion and overflow from the fixing groove 44. Further, there is little risk that, as a result of excessive interference of the inner peripheral portion 266 of the rib 263, the amount of insertion of the outer peripheral portion 267 of the rib 263 into the fixing groove 44 is insufficient, resulting in non-welding or insufficient welding strength. Since the outer peripheral portion 267 of the impeller 25 receives a high fluid pressure, the vane portions 261 may be peeled off from the flange portion 45 if welding strength is insufficient. However, in the present embodiment, since the welding strength of the outer peripheral portions 267 of the vane portions 261 can be secured, the welded portions are less likely to be peeled off even when a high water pressure is received.

In the present embodiment, the welded portion W welded to the fixing groove 44 of the flange portion 45 is a crushed portion where the welding convex portion 264 protruding from the tip end surface of the outer peripheral portion 267 of the rib 263 is crushed. In this way, by providing the welding convex portion 264 at the outer peripheral portion 267, it is possible to avoid that the welding amount at the outer peripheral portion 267 is insufficient. In addition, since the welding convex portion 264 is not provided at the inner peripheral portion 266, it is possible to prevent the inner peripheral portion 266 from becoming excessive interference.

In the present embodiment, each of the ten vane portions 261 includes the vane portion main body 262 that protrudes from the disc portion 26 toward the other side L2 in the axial direction. The plate thickness of the vane portion main body 262 is larger than the width of the fixing groove 44, and the width of the rib 263 protruding from the tip end surface of the vane portion main body 262 is smaller than the width of the fixing groove 44. Therefore, the rigidity of the portion (vane portion main body 262) that receives water pressure is high. In addition, a gap for accommodating welding burrs can be secured between the fixing groove 44 and the rib 263.

In the present embodiment, the rib 263 inserted into the fixing groove 44 includes the intermediate portion 265 connecting the inner peripheral portion 266 and the outer peripheral portion 267, and the intermediate portion 265 includes the reference surface 269 that abuts on the bottom surface of the fixing groove 44. When the reference surface 269 for positioning in the axial direction is provided in the intermediate portion 265 in the radial direction, even in a case where the flange portion 45 does not have a designed shape and is curved into an umbrella shape, the inner peripheral portion 266 is unlikely to become excessive interference, and the welding amount of the outer peripheral portion 267 is unlikely to be insufficient. In the present embodiment, the reference surface 269 is provided on all the ribs 263, but a configuration in which the reference surface 269 is provided on only a part of the plurality of vane portions 261 may be adopted.

In the present embodiment, the tip end surface of the inner peripheral portion 266 of the rib 263 is the step surface 268 recessed to the one side L1 in the axial direction with respect to the reference surface 269. By providing the step on the tip end surface of the rib 263, it is possible to prevent the inner peripheral portion 266 from becoming excessive interference when the reference surface 269 abuts on the bottom surface of the fixing groove 44.

In the present embodiment, the rib 263 inserted into the fixing groove 44 includes the intermediate portion 265 connecting the inner peripheral portion 266 and the outer peripheral portion 267, and in three of the plurality of vane portions 261, the intermediate portions 265 each include the positioning convex portion 270 protruding to the other side L2 in the axial direction, and the positioning convex portion 270 is fitted to the positioning concave portions 271 provided on the bottom surface of the fixing groove 44. In this way, even in a case where a gap is provided between the fixing groove 44 and the rib 263 so that the welding burrs can be accommodated, the vane wheel 24 can be positioned in the direction intersecting the axial direction by fitting the positioning convex portion 270 and the positioning concave portions 271. For example, the vane wheel 24 can be positioned in the circumferential direction. The number of the vane portions 261 provided with the positioning convex portions 270 may be four or more, or may be two.

What is claimed is:

1. A pump device comprising:
    a motor that comprises a rotor and a stator; and
    an impeller that is disposed, when a direction along a rotation axis of the rotor is defined as an axial direction, in a pump chamber provided on one side in the axial direction with respect to the stator and rotates integrally with the rotor,
    wherein the rotor comprises a rotor member comprising a magnet holding portion in a tubular shape, and a drive magnet fixed to an outer peripheral surface of the magnet holding portion,
    the impeller comprises a flange portion provided at an end portion on the one side in the axial direction of the rotor member, and a vane wheel fixed to the flange portion from the one side in the axial direction,
    the vane wheel comprises a disc portion that is opposed to the flange portion in the axial direction, and a plurality of vane portions that protrude from the disc portion toward another side in the axial direction,
    the plurality of vane portions extend to an outer side in a radial direction at a plurality of positions in a circumferential direction around the rotation axis,
    at a tip end on the other side in the axial direction of each of the plurality of vane portions, a rib that is inserted into a fixing groove provided in the flange portion is provided,
    the rib comprises an inner peripheral portion comprising an end portion on an inner side in the radial direction and an outer peripheral portion comprising an end portion on the outer side in the radial direction,
    a gap in the axial direction is provided between a tip end on the other side in the axial direction of the inner peripheral portion and a bottom surface of the fixing groove, and
    at a tip end on the other side in the axial direction of the outer peripheral portion, a welded portion welded to the fixing groove is provided.

2. The pump device according to claim 1, wherein the welded portion is a crushed portion where a welding convex portion protruding from a tip end surface of the outer peripheral portion is crushed.

3. The pump device according to claim 1, wherein
    each of the plurality of vane portions comprises a vane portion main body that protrudes from the disc portion toward the other side in the axial direction, a plate thickness of the vane portion main body is larger than a width of the fixing groove, and
    a width of the rib protruding from a tip end surface of the vane portion main body is smaller than the width of the fixing groove.

4. The pump device according to claim 1, wherein
    the rib comprises an intermediate portion that connects the inner peripheral portion and the outer peripheral portion, and
    the intermediate portion comprises a reference surface that abuts on the bottom surface of the fixing groove.

5. The pump device according to claim 4, wherein a tip end surface of the inner peripheral portion is a step surface recessed to the one side in the axial direction with respect to the reference surface.

6. The pump device according to claim 1, wherein
    the rib comprises an intermediate portion that connects the inner peripheral portion and the outer peripheral portion,
    in at least a part of the plurality of vane portions,
    the intermediate portion comprises a positioning convex portion that protrudes to the other side in the axial direction, and
    the positioning convex portion is fitted into a positioning concave portion provided in the bottom surface of the fixing groove.

* * * * *